United States Patent [19]

Asaoka et al.

[11] Patent Number: 5,438,824
[45] Date of Patent: Aug. 8, 1995

[54] SILICON AS A HIGH ENERGY ADDITIVE FOR FUEL GELS AND SOLID FUEL-GAS GENERATORS FOR PROPULSION SYSTEMS

[75] Inventors: Leo K. Asaoka; William M. Chew; Darren M. Thompson; Douglas L. May, all of Huntsville, Ala.

[73] Assignee: The United States of America as represented by the Secretary of the Army, Washington, D.C.

[21] Appl. No.: 215,747

[22] Filed: Mar. 21, 1994

[51] Int. Cl.$^6$ .............................................. F02K 9/00
[52] U.S. Cl. ........................................ 60/251; 60/252; 60/253
[58] Field of Search ............... 60/252, 253, 251, 245, 60/270.1, 259

[56] References Cited

U.S. PATENT DOCUMENTS

| | | | |
|---|---|---|---|
| 3,830,675 | 8/1974 | Zelinski et al. | 149/19.9 |
| 3,921,394 | 11/1975 | Tannenbaum | 60/217 |
| 3,924,405 | 12/1975 | Cohen et al. | 60/219 |
| 3,977,924 | 8/1976 | McCulloch et al. | 149/19.3 |
| 4,039,360 | 8/1977 | Allan | 149/36 |
| 4,412,874 | 11/1983 | Huskins et al. | 149/19.2 |
| 5,133,183 | 7/1992 | Asaoka et al. | 60/204 |
| 5,139,587 | 8/1992 | Strecker et al. | 60/207 |
| 5,152,136 | 10/1992 | Chew et al. | 60/251 |

Primary Examiner—Timothy S. Thorpe
Attorney, Agent, or Firm—Anthony T. Lane; Hugh P. Nicholson

[57] ABSTRACT

Elemental silicon is a solid high energy material which provides an advantage when added to gel, hybrid, and ducted rocket fuels by increasing both specific impulse, Isp, and density specific impulse, $\rho^*$Isp. The quantity added depends on the specific applications for which the formulation will be used. The usual concentration ranges from about 0.5% to about 70% by weight. The important parameters to consider during formulation are particle size, concentration, combustion efficiency, physical properties, and plume signature. Comparisons for 50% solid fuel loading in a gel bipropulsion system predicts a maximum Isp of 286 lbf.s/lbm as compared to 267 lbf.s/lbm for carbon—a 7% increase. The $\rho^*$Isp produced by silicon is 14.5 lbf.s/cubic inch as compared to 13.7 lbf.s/cubic inch produced by carbon—a 7% increase. A 25% solid loading in solid fuel-gas generators for the hybrid rocket produced a maximum Isp of 278 lbf.s/lbm as compared to 267 lbf.s/lbm produced by carbon—a 4% increase. The $\rho^*$Isp produced by silicon is 14.8 lbf.s/cubic inch as compared to 14.1 lbf.s/cubic inch produced by carbon—a 5% increase. Another advantage for silicon loaded gel fuels is the large "plateau" in the performance versus oxygen/fuel curves, and, resulting in a less stringent oxidizer-to-fuel ratio (O/F) control in an operational system.

3 Claims, 4 Drawing Sheets

SILICON AS A HIGH ENERGY ADDITIVE FOR FUEL GELS AND SOLID FUEL-GAS GENERATORS FOR PROPULSION SYSTEMS

DEDICATORY CLAUSE

The invention described herein may be manufactured, used, and licensed by or for the Government for governmental purposes without the payment to us of any royalties thereon.

BACKGROUND OF THE INVENTION

Liquid propellants, solid propellants, and gelled propellants have been developed to high levels of performance. Each of the propellant types has been preferred for a specific use. Solid propellant propulsion has been widely used by the military services as evidenced by the many well known solid rocket systems. Solid propellants have been employed in many well known systems having a large variation in sizes from very small to extremely large rocket motors. Solid propellant composition developmental programs specifically devoted to solid binder ingredients, oxidizing salts both organic and inorganic, plasticizers, stabilizers, burning rate modifiers and catalysts, curing agents, processing aids and metal fuel additives in advancing the state-of-the-art. Further discussions relating to solid propellant classification groups are set forth hereinbelow since solid propellants have dominated the propulsion field over the years.

Solid propellants are generally classified into two groups: homogeneous propellants and composite propellants. Composite propellants consist of propellants wherein solid oxidizers and other solid additives are dispersed within an organic binder such as polybutadiene-acrylic acid polymers, polysulfide polymer, polyester heteropolymerized with unsaturated olefins, and polyurethanes. The homogenous propellant consists of gel type propellants of single, double, and triple base type. Double-base propellants containing nitrocellulose, a plasticizer, metal fuel, inorganic oxidizer, stabilizers, processing aid, cross-linking agent, and burning rate catalyst have been particularly attractive because of the high burning rates and stabilities thereof.

Gelled propellant fuel such as a thixotropic rocket fuel comprised of monomethylhydrazine, metallic fuel particles, dimethylurea, and a gellant is disclosed in U.S. Pat. No. 4,039,360 for an invention issued to Barry D. Allan on Aug. 2, 1977. This thixotropic fuel gel has the ability even with low gellant concentration to maintain metallic fuel particles dispersed therein even under several hundred g's loading. For applications where fuel tank volume is limited, it is desirable to increase the density of the fuel (by adding metallic fuel particles) while maintaining a high specific impulse.

The combination of liquid gel fuel and liquid gelled oxidizers have been employed in hypergolic propulsion system. A well known oxidizer gel is inhibited red fuming nitric acid gel (IRFNA GEL). This oxidizer gel has also been employed with a gel/solid bipropellant propulsion system. A gel/solid bipropellant propulsion system is also known as a hybrid system. A gel/solid bipropellant propulsion system with energy management capability as disclosed in U.S. Pat. No. 5,133,183 for an invention issued to Asaoka, Chew and May on Jul. 28, 1992 is commonly assigned to the United States of America as represented by the Secretary of the Army, Washington, D.C. Leo Asaoka, and Douglas L. May and William M. Chew are joint inventors who are also joint inventors of the present invention. The propulsion system of U.S. Pat. No. 5,133,183 employs a solid fuel gas generator to furnish fuel-rich combustion gases which serves as the pressurization source to expel IRFNA gel and also serves as a fuel for hypergolic reaction with the simultaneously injected IRFNA gel in a combustion chamber.

A solid fuel ducted rocket with gel-oxidizer augmentation propulsion is disclosed in U.S. Pat. No. 5,152,136, issued on Oct. 6, 1992 to Chew et al and commonly assigned to the United States of America as represented by the Secretary of the Army, Washington, D.C. This system employs a solid fuel gas generator (SFGG) in combination with IRFNA gel for higher thrust in a boost or dash stage of a flight. The air ducts of the ducted member scoop air in from the atmosphere for hypergolic reaction with fuel-rich hot gases during a sustain stage of a flight.

The above patents issued to Asaoka et al and Chew et al describe approaches for achieving on-demand, variable thrust performances wherein the variable thrust results in a cost to propellant usage efficiency. The use of multiple liquid or gel engines, which can be turned on and off in various combinations to provide incrementally variable thrust results in additional costs in addition to lower propellant usage efficiency as a result of multiple combinations which are significantly higher in total cost.

The present requirements for tactical rocket motor and rocket engines having acceptable minimum signature rocket plume signatures and which have essentially inherent insensitive munition (IM) properties, have influenced the development of an additive for fuel gels and solid fuel-gas generators. Such an additive when considered for use with the systems described hereinabove and which meet the present requirements for tactical missile would be a desirable achievement in its field of use with the recognized advantages set forth hereinbelow.

An advantage of gel, hybrid, and ducted rocket fuels is that they can be loaded with solid high energy materials that increase both specific impulse, Isp, and density impulse $\rho$*Isp. Gel bipropulsion, hybrid, and ducted rockets have separate fuel and oxidizer supply systems that cannot interact unless injected into the combustion chamber. The systems, therefore, have essentially inherent insensitive munition (IM) properties. Solid propellants can not make efficient use of solid fuel additives because they are already fuel rich: if additional solids could be incorporated into them, then solid oxidizers are preferred. Gel propulsion systems have used fuel gels containing aluminum and carbon, whereas solid fuel-gas generators have been used with carbon and hydrocarbons as additives.

Several solid materials, such as aluminum and boron, have been used as solid fuels in propulsion systems; however, rocket plume signatures of these materials are unacceptable. With a few exceptions, the Army prefers propulsion systems with minimum signature to decrease launch point detection and increase survivability, to minimize interference with seekers and communications in the battle field, and to increase kill probability.

An objective of this invention is to provide a high energy additive for solid fuel-gas generators applicable to gas-gelled oxidizer hybrid rockets.

Another object of this invention is to provide a solid additive for solid fuels employed in solid-fuel-gas generators applicable for ducted rockets.

A further object of this invention is to provide a solid fuel for addition to a solid fuel gas generator during formulation to improve physical properties, and good ejection efficiency during combustion of the solid fuel gas generators to produce fuel-rich hot gases for further combusting in a combustion chamber of a solid fuel ducted rockets and fuel gas-gelled oxidizer hydrid rockets.

Still a further object of this invention is to provide a minimum signature solid loading for a fuel gel to replace metal and carbon in hybrid loaded fuel gels whereby the density specific impulse ($\rho^*Isp$) is higher than that of the carbon loaded fuel gel.

SUMMARY OF THE INVENTION

Elemental silicon is added to fuel gels and solid fuel gas generators to increase the Isp and $d^*Isp$. The beneficial range of the elemental silicon ranges from about 0.5% to about 70% by weight. The important parameters to consider during formulation are particle size concentration, combustion efficiency, physical properties, and plume signature.

DESCRIPTION OF THE PREFERRED EMBODIMENT(S)

Elemental silicon is a dense solid material that releases considerable energy when it combusts to form silicon dioxide. The heat of formation for silicon dioxide (3418 cal/g) is similar to that for aluminum oxide (4000 cal/g), the standard high energy solid fuel. Motor tests in which silicon dioxide were added to a minimum signature solid propellant, to simulate concentrations required for gelling IRFNA oxidizer gel, had minimum signature properties in MICOM's Signature Characterization Facility. These results suggest that silicon can be used as a minimum signature solid additive in the pertinent propellant formulations.

Figure 1:
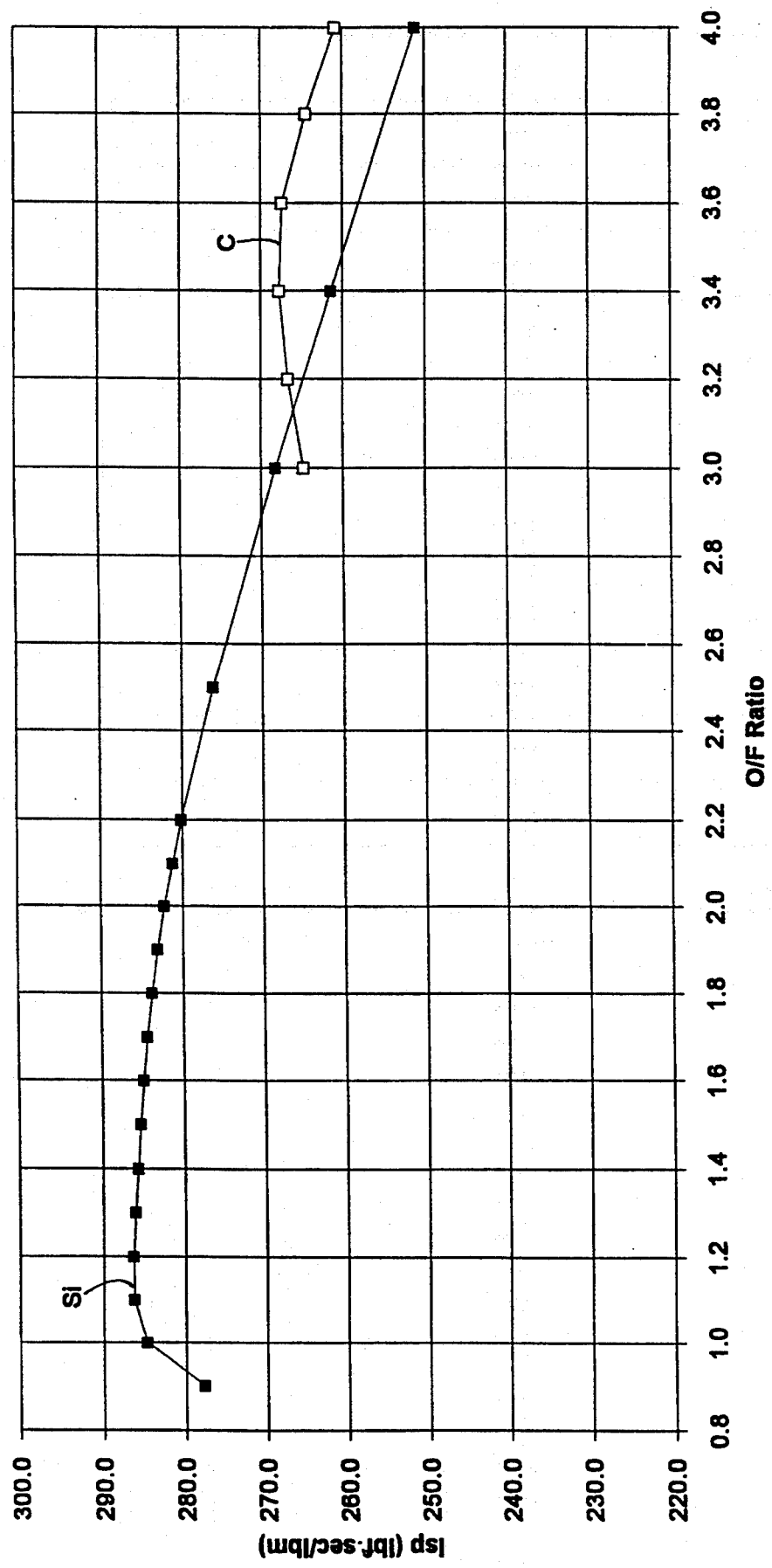
FIG. 1 compares the specific impulse (Isp) for 50% solid fuel loading in a gel bipropulsion system containing silicon (Si) to that of carbon (C) with the oxidizer/fuel (O/F) ratio varying from about 0.8 to about 4.0.
Figure 2:
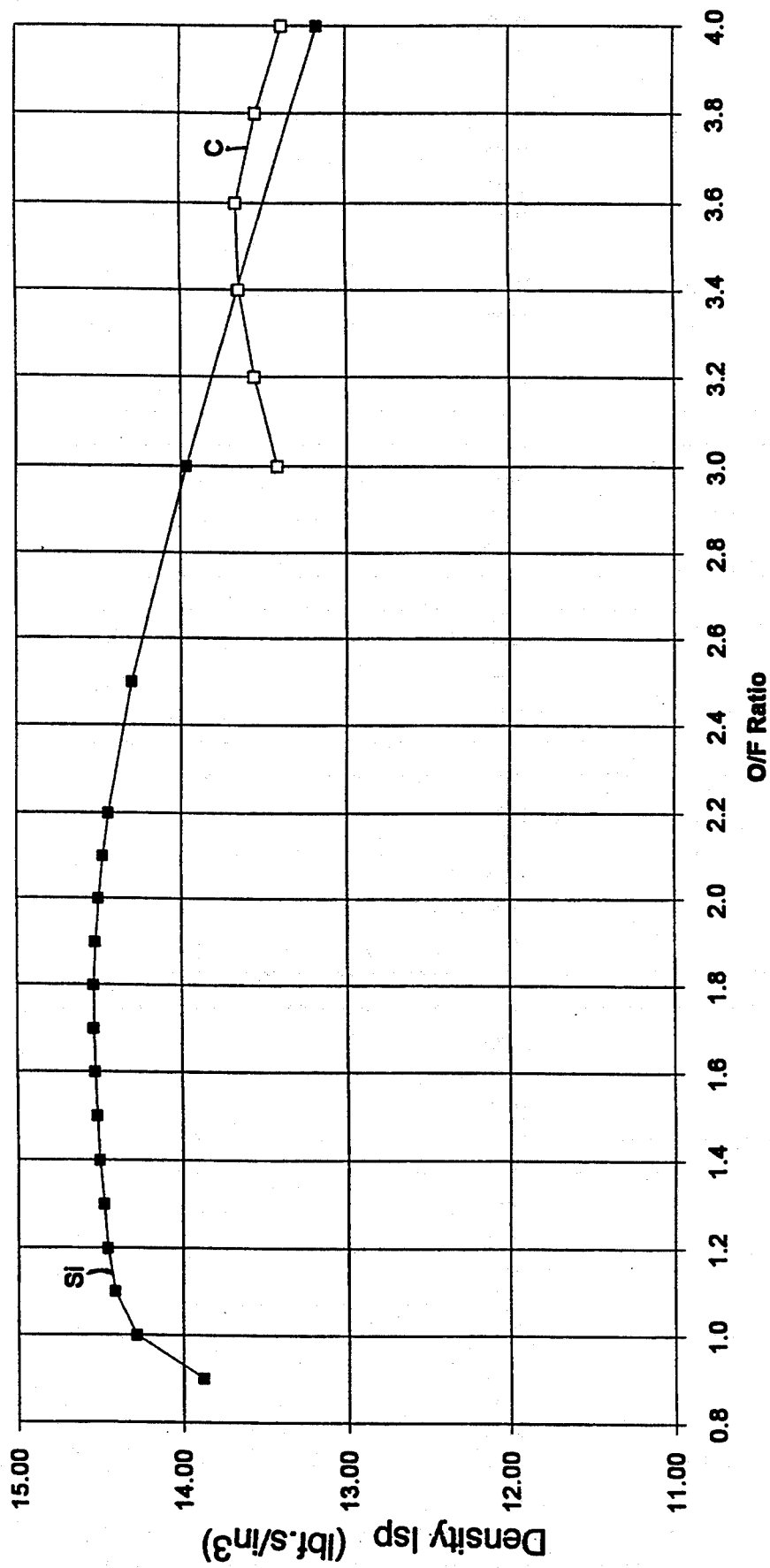
FIG. 2 compares the density *Isp for 50% solid fuel loading in bi-gel rockets containing silicon to that for carbon with the oxidize/fuel (O/F) ratio varying from about 0.8 to about 4.0.

Comparisons of theoretical Isp and $\rho^*Isp$ between silicon and carbon loaded fuels are given in FIGS. 1–4. FIGS. 1 and 2 contain data for 50% solid fuel loading in a gel bipropulsion system that predicts a maximum Isp of 286 lbf.s/lbm, as compared to 267 lbf-s/lbm for carbon—a 7% increase. The $\rho^*Isp$ produced by silicon is 14.5 lbf.s/in$^3$ as compared to 13.7 lbf.s/in$^3$ produced by carbon—a 6% increase. Refer to Table 1 for data corresponding to FIG. 1. Another advantage for silicon loaded gel fuels is the large "plateau" in the performance vs. O/F curves, resulting in less stringent O/F control in an operational system.

TABLE 1

50% Si/MMH Bigel Rocket With Gas Expansion From 2000-14.7 psia

| O/F | d (lb/in$^3$) | d (g/cc) | Isp (lbf·sec/lbm) | Density Isp (lbf·sec/in$^3$) | Optimum expansion ratio |
|---|---|---|---|---|---|
| 0.9 | 0.0500 | 1.383 | 277.7 | 13.88 | 18.25 |
| 1.0 | 0.0502 | 1.389 | 284.7 | 14.28 | 18.65 |
| 1.1 | 0.0504 | 1.394 | 286.2 | 14.41 | 19.10 |
| 1.2 | 0.0505 | 1.398 | 286.3 | 14.46 | 19.10 |
| 1.3 | 0.0506 | 1.402 | 286.0 | 14.48 | 19.09 |
| 1.4 | 0.0508 | 1.406 | 285.7 | 14.51 | 19.08 |
| 1.5 | 0.0509 | 1.409 | 285.3 | 14.52 | 19.07 |
| 1.6 | 0.0510 | 1.412 | 284.9 | 14.54 | 19.08 |
| 1.7 | 0.0511 | 1.415 | 284.4 | 14.54 | 19.11 |
| 1.8 | 0.0512 | 1.418 | 283.8 | 14.54 | 19.16 |
| 1.9 | 0.0513 | 1.421 | 283.1 | 14.53 | 19.23 |
| 2.0 | 0.0514 | 1.423 | 282.2 | 14.51 | 19.31 |
| 2.1 | 0.0515 | 1.425 | 281.2 | 14.48 | 19.39 |
| 2.2 | 0.0516 | 1.428 | 280.1 | 14.44 | 19.43 |
| 2.5 | 0.0518 | 1.433 | 276.1 | 14.30 | 19.33 |
| 3.0 | 0.0521 | 1.441 | 268.2 | 13.96 | 18.70 |
| 3.4 | 0.0522 | 1.446 | 261.4 | 13.66 | 18.06 |
| 4.0 | 0.0525 | 1.452 | 251.1 | 13.17 | 17.35 |

Refer to Table 2 for data corresponding to FIG. 2. Another advantage for silicon loaded gel fuels is the large "plateau" in the performance vs O/F curves, resulting in less stringent O/F control in an operational system.

TABLE 2

50% C/MMH Bigel Rocket With Gas Expansion From 2000-14.7 psia

| O/F | d (lb/in$^3$) | d (g/cc) | Isp (lbf·s/lbm) | Density Isp (lbf·s/in$^3$) | Optimum expansion ratio |
|---|---|---|---|---|---|
| 3.0 | 0.0507 | 1.402 | 264.8 | 13.41 | 15.30 |
| 3.2 | 0.0508 | 1.407 | 266.7 | 13.55 | 15.81 |
| 3.4 | 0.0510 | 1.410 | 267.7 | 13.64 | 16.45 |
| 3.6 | 0.0511 | 1.414 | 267.4 | 13.66 | 17.27 |
| 3.8 | 0.0512 | 1.417 | 264.4 | 13.54 | 16.97 |
| 4.0 | 0.0513 | 1.420 | 260.8 | 13.38 | 16.57 |

Figure 3:
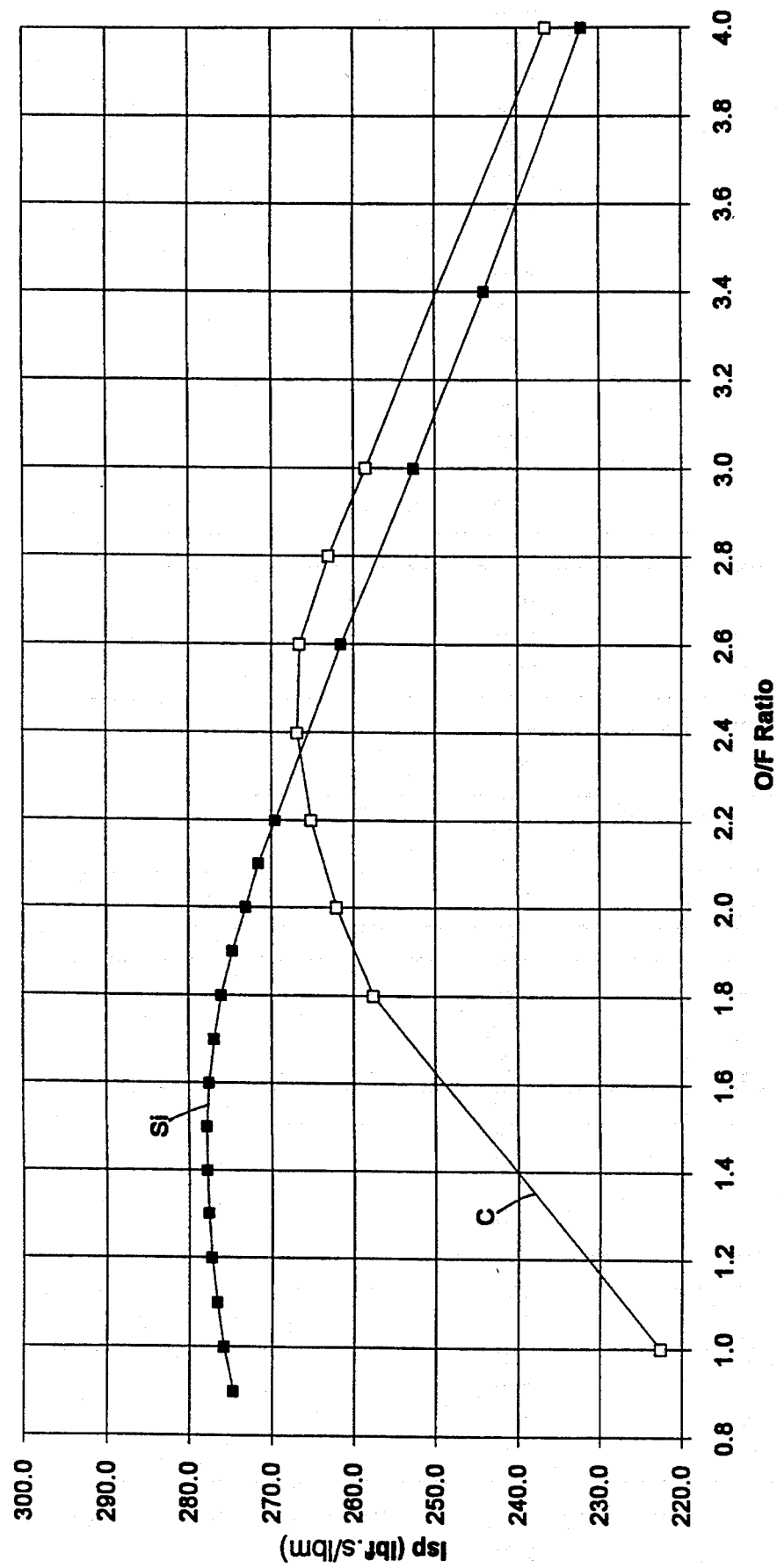
FIG. 3 compares the specific impulse for 25% solid fuel loading in a hybrid rocket containing silicon to that of carbon with the oxidizer/fuel (O/F) ratio varying from about 0.8 to about 4.0.
Figure 4:
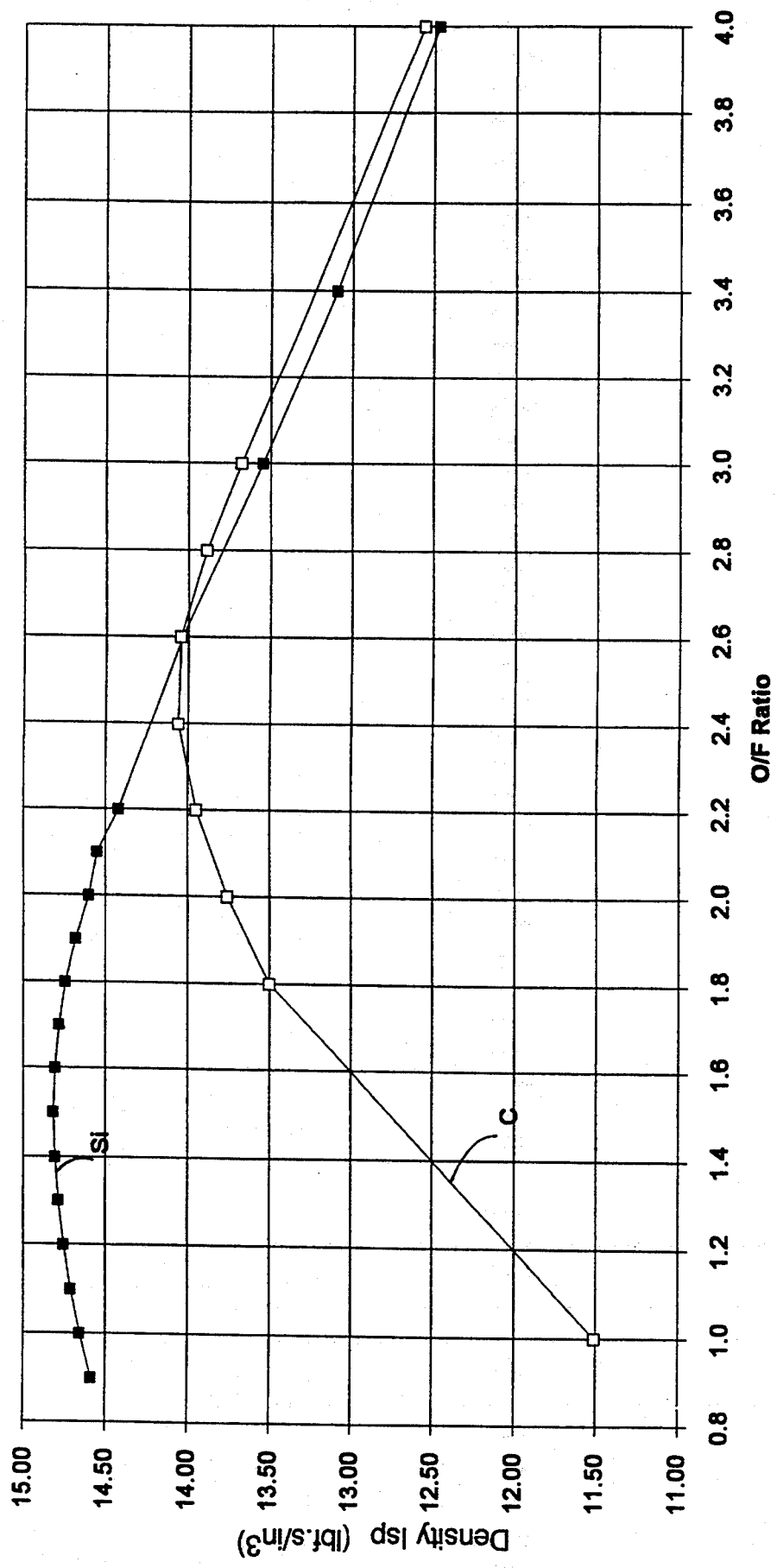
FIG. 4 compares the density *Isp for 25% solid fuel loaded hybrid rockets containing silicon to that of carbon with the oxidizer/fuel (O/F) ratio varying from about 0.8 to about 4.0.

FIGS. 3 and 4 contain data for 25% solid loading in solid fuel gas generators for the hybrid rocket. For this system, silicon produces a maximum Isp of 278 lbf.s/lbm as compared to 267 lbf.s/lbm produced by carbon—a 4% increase. The $\rho^*Isp$ produced by silicon is 14.8 lbf.s/in$^3$ as compared to 14.1 lbf.s/in$^3$ produced by carbon—a 5% increase. Although the plateau for silicon in the hybrid is not as large as for the gel system, the $\rho^*Isp$ is higher that for the gel system, and it is significantly larger than that of the carbon hybrid fuel. Refer to Tables 3 and 4 for data corresponding to FIGS. 3 and 4. Refer to formulations E and F of Examples IV and V.

TABLE 3

25% Si GAP Hybrid With Gas Expansion From 2000-14.7 psia

| O/F | d (lb/in$^3$) | d (g/cc) | Isp (lbf·s/lbm) | Density Isp (lbf·s/in$^3$) | Optimum expansion ratio |
|---|---|---|---|---|---|
| 0.9 | 0.0531 | 1.470 | 274.7 | 14.59 | 16.50 |
| 1.0 | 0.0532 | 1.471 | 275.8 | 14.66 | 16.77 |
| 1.1 | 0.0532 | 1.472 | 276.6 | 14.71 | 17.04 |
| 1.2 | 0.0532 | 1.473 | 277.2 | 14.76 | 17.30 |
| 1.3 | 0.0533 | 1.474 | 277.6 | 14.79 | 17.33 |
| 1.4 | 0.0533 | 1.476 | 277.8 | 14.81 | 17.59 |
| 1.5 | 0.0533 | 1.476 | 277.8 | 14.82 | 17.86 |
| 1.6 | 0.0534 | 1.477 | 277.5 | 14.81 | 18.16 |

TABLE 3-continued

25% Si GAP Hybrid With
Gas Expansion From 2000–14.7 psia

| O/F | d (lb/in³) | d (g/cc) | Isp (lbf·s/ lbm) | Density Isp (lbf·s/ in³) | Optimum expansion ratio |
|---|---|---|---|---|---|
| 1.7 | 0.0534 | 1.478 | 276.9 | 14.78 | 18.46 |
| 1.8 | 0.0534 | 1.479 | 276.0 | 14.74 | 18.73 |
| 1.9 | 0.0534 | 1.479 | 275.7 | 14.68 | 18.88 |
| 2.0 | 0.0535 | 1.480 | 273.1 | 14.60 | 18.89 |
| 2.1 | 0.0536 | 1.483 | 271.5 | 14.55 | 18.83 |
| 2.2 | 0.0535 | 1.481 | 269.5 | 14.42 | 18.65 |
| 2.6 | 0.0537 | 1.486 | 261.5 | 14.03 | 17.84 |
| 3.0 | 0.0536 | 1.484 | 252.6 | 13.54 | 17.08 |
| 3.4 | 0.0537 | 1.486 | 244.0 | 13.10 | 16.39 |
| 4.0 | 0.0537 | 1.487 | 232.1 | 12.47 | 15.63 |

TABLE 4

25% C GAP Hybrid With
Gas Expansion From 2000–14.7 psia

| O/F | d (lb/in³) | d (g/cc) | Isp (lbf·s/ lbm) | Density Isp (lbf·s/ in³) | Optimum expansion ratio |
|---|---|---|---|---|---|
| 1.0 | 0.0517 | 1.431 | 222.6 | 11.51 | 15.63 |
| 1.8 | 0.0524 | 1.449 | 257.6 | 13.50 | |
| 2.0 | 0.0525 | 1.452 | 262.0 | 13.76 | 14.98 |
| 2.2 | 0.0526 | 1.455 | 265.1 | 13.94 | |
| 2.4 | 0.0527 | 1.458 | 266.8 | 14.06 | |
| 2.6 | 0.0527 | 1.460 | 266.5 | 14.04 | 17.44 |
| 2.8 | 0.0528 | 1.462 | 263.0 | 13.89 | |
| 3.0 | 0.0529 | 1.463 | 258.5 | 13.67 | |
| 4.0 | 0.0531 | 1.431 | 236.5 | 12.56 | |

The abbreviations in Tables 1–4 are as follows:
MMH=monomethylhydrazine
C=Carbon
Si=Silicon
GAP=Glycidyl azide polymer
O/F=oxidizer to fuel ratio A thixotropic rocket fuel is disclosed in commonly assigned U.S. Pat. No. 4,039,360. A representative fuel gel formulation which serves as a means for evaluation of elemental silicon is shown under Example I below. The preferred gellant is hydroxypropyl cellulose containing about 4.6 propoxyl groups per glucose unit (Klucel, a brand name by Aqualon). Other cellulose or hydroxyalkyl-substituted gelling agents may be employed.

Example 1: Thixotropic Fuel Gel

| Function | Ingredient | % By Weight |
|---|---|---|
| gellant | Hydroxypropyl cellulose | 1.4 |
| additive | Dimethylurea | .1 |
| solid-fuel | Aluminum | 60.0 |
| liquid-fuel | Monomethylhydrazine | 38.5 |
| Total | | 100.0 |

The above fuel gel has a liquid fuel of monomethylhydrazine, a solid fuel of aluminum, a gellant, and an additive of dimethylurea.

A control formulation (50% carbon loaded fuel gel) which did not contain aluminum is set forth below under Example II.

EXAMPLE II: Control Thixotropic Carbon Loaded Fuel Gel

| Function | Ingredient | Formulation A % by weight | Formulation B % by weight |
|---|---|---|---|
| solid-fuel | Carbon | 50.0* | 25.0** |
| gellant | Hydroxypropyl cellulose | 1.4 | 2.1 |
| additive | Dimethylurea | 0.2 | 0.3 |
| liquid-fuel | MMH | 48.4 | 72.6 |
| Total | | 100.0 | 100.0 |

*38% by weight 240 nanometer carbon black
12% by weight 95 nanometer carbon black
**19% by weight of 240 nanometer carbon black
6% weight of 95 nanometer carbon black The data for the above formulation A is set forth in Table 2. The improved formulation (50% and 25% silicon loaded fuel gel) is set forth below under Example III.

EXAMPLE III: Novel Thixotropic Silicon Loaded Fuel Gel

| Function | Ingredient | Formulation C % by weight | Formulation D % by weight |
|---|---|---|---|
| solid-fuel | Silicon | 50.0 | 25.0 |
| gellant | Hydroxypropyl cellulose | 1.4 | 2.1 |
| additive | Dimethylurea | 0.2 | 0.3 |
| liquid-fuel | MMH | 48.4 | 72.6 |
| Total | | 100.0 | 100.0 |

The data for the above formulation C is set forth in Table I. The comparisons showing the improvement gained by silicon are set forth hereinabove prior to Tables 1 and 2 data.

A control formulation E for a solid fuel-gas generator based on solid carbon loading is set forth hereinbelow under Example IV.

EXAMPLE IV: Control Solid Fuel-Gas Generator, Carbon Loaded

| Ingredient | Formulation E % by weight |
|---|---|
| Polyfunctional GAP | 70.58 |
| Hexamethyl diisocyanate | 4.42 |
| Carbon black | 25.00 |
| Total | 100.00 |

*19% by weight 240 nanometer particle size
6% by weight 95 nanometer particle size The improved formulation for a solid fuel gas generator based on solid silicon loading is set forth hereinbelow under Example V.

EXAMPLE V: Solid Fuel-Gas Generator, Silicon Loaded

| Ingredient | Formulation F % by weight |
|---|---|
| Polyfunctional GAP | 70.58 |
| Hexamethyl diisocyante | 4.42 |
| Silicon | 25.00 |
| Total | 100.00 |

The data for the above formulation F is set forth in Table 3. The comparisons showing the improvement gained by silicon are set forth hereinabove prior to Tables 3 and 4 data.

A control formulation E for a solid fuel-gas generator based on solid carbon loading is set forth hereinabove under Example IV.

Silicon-loaded solid fuels are also applicable to ducted rocket propulsion system. An example of a ducted rocket and a solid gas generator is disclosed in commonly assigned U.S. Pat. No. 5,152,136.

Elemental silicon is added to fuel gels and fuel-gas generators to increase their Isp and $\rho^*$Isp. The quantity of silicon depends on the specific application for which the formulation will be used. The usual concentration ranges from about 0.5% to about 70% by weight. The important parameters to consider during formulation are particle size, concentration, combustion efficiency, physical properties, and plume signature.

A fuel-gas generator is also disclosed in commonly assigned U.S. Pat. No. 5,133,183.

We claim:

1. In a propulsion system selected from a gel bipropulsion propulsion system, a hybrid propulsion system, and a ducted rocket propulsion system with each of said propulsion systems having a separate fuel supply system and a separate oxidizer supply system that cannot interact to yield propulsion unless injected and combined in a combustion chamber, said gel bipropulsion propulsion system comprised of a liquid fuel of monomethylhydrazine, a solid fuel of carbon black, a gellant of hydroxyalkyl-substituted cellulose, and an additive of dimethylurea, and said hybrid propulsion system and said ducted rocket propulsion system having a solid fuel gas generator comprised of a polyfunctional glycidyl azide polymer, a diisocyanate crosslinking agent, and carbon black fuel; the improvement of the specific impulse and the density specific impulse of said fuel system of said gel bipropulsion propulsion system, said hybrid propulsion system, and said ducted rocket propulsion system achieved by including from about 0.5 weight percent to about 70 weight percent a solid high energy material silicon to replace all weight percent of said solid fuel of said carbon black of said gel bipropulsion propulsion system, all weight percent of said carbon black of said hybrid propulsion system, and all weight percent of said carbon black of said ducted rocket propulsion system.

2. The improvement as defined in claim 1 wherein incorporating 50 weight percent solid fuel loading of said silicon in said gel bipropulsion propulsion system results in a maximum specific impulse of 286 lbf.s/lbm as compared to 267 lbf.s/lbm for produced by solid fuel loading of carbon and wherein said solid fuel loading of silicon results in a density specific impulse of 14.5 lbf.s/cubic inch as compared to 13.7 lbf.s/cubic inch produced by said solid fuel loading of carbon.

3. The improvement as defined in claim 1 wherein incorporating 25 weight percent solid loading of said solid fuel-gas generator of said hybrid propulsion system results in a maximum specific impulse of 278 lbf.s/lbm as compared to 267 lbf.s/lbm for 25 weight percent solid fuel loading of carbon and wherein said solid fuel loading of silicon results in a density specific impulse of 14.8 lbf.s/cubic inch as compared to 14.1 lbf.s/cubic inch produced by said 25 weight percent solid fuel loading of carbon.

* * * * *